United States Patent
Stork et al.

(10) Patent No.: US 12,253,223 B2
(45) Date of Patent: *Mar. 18, 2025

(54) EXPANDABLE SOLAR-POWERED LIGHT

(71) Applicant: LuminAID LAB LLC, Littleton, NH (US)

(72) Inventors: Anna Stork, Chicago, IL (US); Andrea Sreshta, Chicago, IL (US)

(73) Assignee: LuminAID LAB, LLC, Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 18/525,305

(22) Filed: Nov. 30, 2023

(65) Prior Publication Data

US 2024/0344674 A1     Oct. 17, 2024

Related U.S. Application Data

(63) Continuation of application No. 18/104,412, filed on Feb. 1, 2023, now Pat. No. 11,885,466, which is a
(Continued)

(51) Int. Cl.
*F21L 4/08* (2006.01)
*A63B 41/00* (2006.01)
(Continued)

(52) U.S. Cl.
CPC ................ *F21L 4/08* (2013.01); *A63B 43/06* (2013.01); *F21S 9/037* (2013.01); *F21V 3/02* (2013.01); *F21V 3/026* (2013.01); *F21V 3/062* (2018.02); *F21V 3/0625* (2018.02); *F21V 23/005* (2013.01); *F21V 23/04* (2013.01);
(Continued)

(58) Field of Classification Search
CPC .......... F21L 4/08; F21V 3/02; F21V 23/0414; F21V 31/00; F21Y 2115/10
See application file for complete search history.

(56) References Cited

U.S. PATENT DOCUMENTS 2,245,715 A    6/1941  Rieck
3,553,866 A    1/1971  Redford et al.
(Continued)

FOREIGN PATENT DOCUMENTS

CA    152065      5/2014
CN    1162496    10/1997
(Continued)

OTHER PUBLICATIONS

Innovation Q+ NPL (Year: 2024).*
(Continued)

*Primary Examiner* — Anabel Ton
(74) *Attorney, Agent, or Firm* — Fish & Richardson P.C.

(57) ABSTRACT

An inflatable solar-powered light is provided. The solar-powered light includes a bladder and a solar-powered light assembly disposed entirely within the bladder. The solar-powered light assembly includes a solar panel, a rechargeable battery in electrical communication with the solar panel, and at least one light-emitting diode in electrical communication with the rechargeable battery. The bladder is substantially transparent, flexible, inflatable, and collapsible.

20 Claims, 8 Drawing Sheets

Related U.S. Application Data continuation of application No. 17/666,082, filed on Feb. 7, 2022, now Pat. No. 11,592,147, which is a continuation of application No. 15/585,450, filed on May 3, 2017, now Pat. No. 11,242,962, which is a continuation of application No. 15/161,670, filed on May 23, 2016, now Pat. No. 11,255,501, which is a continuation of application No. 14/397,722, filed as application No. PCT/US2012/061848 on Oct. 25, 2012, now Pat. No. 9,347,629.

(60) Provisional application No. 61/640,769, filed on May 1, 2012.

(51) Int. Cl.
| | |
|---|---|
| *A63B 43/06* | (2006.01) |
| *F21S 9/03* | (2006.01) |
| *F21V 3/02* | (2006.01) |
| *F21V 3/06* | (2018.01) |
| *F21V 23/00* | (2015.01) |
| *F21V 23/04* | (2006.01) |
| *F21V 31/00* | (2006.01) |
| *F21W 111/10* | (2006.01) |
| *F21Y 115/10* | (2016.01) |

(52) U.S. Cl.
CPC .......... *F21V 23/0414* (2013.01); *F21V 31/00* (2013.01); *F21V 31/005* (2013.01); *A63B 41/00* (2013.01); *F21W 2111/10* (2013.01); *F21Y 2115/10* (2016.08)

(56) References Cited

U.S. PATENT DOCUMENTS

| | | | |
|---|---|---|---|
| 4,243,432 A | 1/1981 | Jordan | |
| 4,503,563 A | 3/1985 | Johnson | |
| 4,692,557 A | 9/1987 | Samuelson | |
| 4,979,339 A | 12/1990 | Jones et al. | |
| D314,835 S | 2/1991 | Ebihara | |
| 5,083,250 A | 1/1992 | Malcom | |
| 5,231,781 A | 8/1993 | Dunbar | |
| 5,427,258 A | 6/1995 | Krishnakumar et al. | |
| 5,603,648 A | 2/1997 | Kea | |
| 5,782,552 A | 7/1998 | Green et al. | |
| D397,470 S | 8/1998 | Bassford et al. | |
| 5,888,156 A | 3/1999 | Cmiel et al. | |
| 5,890,794 A | 4/1999 | Abtahi et al. | |
| 5,947,581 A * | 9/1999 | Schrimmer | F21V 3/023 362/363 |
| 6,013,985 A | 1/2000 | Green et al. | |
| 6,018,960 A | 2/2000 | Parienti | |
| 6,027,225 A | 2/2000 | Martin et al. | |
| 6,193,392 B1 | 2/2001 | Lodhie | |
| 6,200,000 B1 | 3/2001 | Burnidge | |
| 6,254,247 B1 | 7/2001 | Carson | |
| 6,276,815 B1 | 8/2001 | Wu | |
| 6,280,344 B1 | 8/2001 | Robb | |
| 6,371,637 B1 | 4/2002 | Atchinson et al. | |
| D465,874 S | 11/2002 | Gravin et al. | |
| D468,037 S | 12/2002 | Jarvis | |
| 6,499,857 B1 | 12/2002 | Lumley | |
| 6,502,953 B2 | 1/2003 | Hajianpour | |
| D485,003 S | 1/2004 | Olson | |
| 7,318,656 B1 | 1/2008 | Merine | |
| 7,322,137 B2 | 1/2008 | Machala | |
| 7,377,667 B2 | 5/2008 | Richmond | |
| 7,458,698 B2 | 12/2008 | Heathcock | |
| 7,500,746 B1 | 3/2009 | Howell et al. | |
| 7,611,396 B2 | 11/2009 | Schnuckle | |
| 7,690,812 B2 | 4/2010 | Roberts et al. | |
| 7,699,495 B2 | 4/2010 | Au | |
| D617,925 S | 6/2010 | Coushaine et al. | |
| 7,753,576 B2 * | 7/2010 | Marcinkewicz | F21S 9/037 362/555 |
| D627,090 S | 11/2010 | Sanoer | |
| 7,825,325 B2 | 11/2010 | Kennedy et al. | |
| 7,857,490 B1 | 12/2010 | Fett et al. | |
| D639,494 S | 6/2011 | Schrimmer et al. | |
| 8,011,816 B1 | 9/2011 | Janda | |
| 8,550,663 B2 * | 10/2013 | Tong | F21V 33/00 362/249.14 |
| D694,445 S | 11/2013 | Shiu | |
| D699,376 S | 2/2014 | Kim | |
| D706,968 S | 6/2014 | Mcdonough et al. | |
| 8,845,126 B1 | 9/2014 | Martzall | |
| 9,016,886 B2 | 4/2015 | Snyder | |
| D728,835 S | 5/2015 | Metlen et al. | |
| D728,836 S | 5/2015 | Metlen et al. | |
| 9,022,614 B2 | 5/2015 | Chin-Huan | |
| D738,553 S | 9/2015 | Fletcher | |
| D741,530 S | 10/2015 | Snyder | |
| D745,988 S | 12/2015 | Ahn | |
| 9,200,770 B2 * | 12/2015 | Chun | B65D 7/24 |
| 9,347,629 B2 * | 5/2016 | Stork | F21V 3/02 |
| D759,869 S | 6/2016 | Huang | |
| D775,390 S | 12/2016 | Zimmer | |
| D777,362 S | 1/2017 | Killion et al. | |
| D778,474 S | 2/2017 | Scazziga | |
| D816,250 S | 4/2018 | Wang | |
| D844,875 S | 4/2019 | Jeon | |
| D848,043 S | 5/2019 | Zhuo | |
| D870,701 S | 12/2019 | Lee | |
| D888,306 S | 6/2020 | Ho | |
| D932,078 S | 9/2021 | Sreshta | |
| D935,081 S | 11/2021 | Peng | |
| 11,242,962 B2 * | 2/2022 | Stork | F21V 23/0414 |
| 11,248,755 B2 | 2/2022 | Sreshta et al. | |
| 11,255,501 B2 | 2/2022 | Stork et al. | |
| D946,802 S | 3/2022 | Wijaya | |
| D972,180 S | 12/2022 | Hou | |
| D974,614 S | 1/2023 | Liao | |
| D979,112 S | 2/2023 | Claeys | |
| 11,592,147 B2 | 2/2023 | Stork et al. | |
| D992,185 S | 7/2023 | Zheng | |
| D993,519 S | 7/2023 | Zhou | |
| 2002/0085329 A1 | 7/2002 | Lee | |
| 2003/0169590 A1 | 9/2003 | Sorli et al. | |
| 2004/0130888 A1 | 7/2004 | Twardawski | |
| 2005/0002188 A1 | 1/2005 | Bucher et al. | |
| 2005/0007773 A1 | 1/2005 | Austin | |
| 2005/0261091 A1 | 11/2005 | Buschfort | |
| 2005/0265029 A1 | 12/2005 | Epstein et al. | |
| 2006/0108612 A1 | 5/2006 | Richmond | |
| 2006/0193126 A1 | 8/2006 | Kuelbs et al. | |
| 2006/0221595 A1 | 10/2006 | Payne | |
| 2006/0279956 A1 | 12/2006 | Richmond | |
| 2006/0291217 A1 | 12/2006 | Vanderschuit | |
| 2007/0014125 A1 | 1/2007 | Chu | |
| 2007/0091594 A1 | 4/2007 | Soon | |
| 2007/0109772 A1 | 5/2007 | Chang | |
| 2007/0147063 A1 | 6/2007 | Collomb et al. | |
| 2007/0183143 A1 | 9/2007 | Allsop et al. | |
| 2008/0013317 A1 | 1/2008 | Hinds | |
| 2008/0032589 A1 | 2/2008 | Sun | |
| 2008/0130272 A1 | 6/2008 | Waters | |
| 2008/0175005 A1 | 7/2008 | Kellmann et al. | |
| 2008/0175006 A1 | 7/2008 | Kellmann et al. | |
| 2008/0266860 A1 | 10/2008 | Marcinkewicz et al. | |
| 2008/0273319 A1 | 11/2008 | VanderSchuit | |
| 2008/0311820 A1 | 12/2008 | Murdock | |
| 2009/0053946 A1 | 2/2009 | Ashby | |
| 2009/0133636 A1 | 5/2009 | Richmond | |
| 2009/0141491 A1 | 6/2009 | Chu | |
| 2009/0175029 A1 | 7/2009 | Chiang | |
| 2009/0268439 A1 | 10/2009 | Chen | |
| 2009/0269045 A1 | 10/2009 | Astill | |
| 2009/0322495 A1 | 12/2009 | Richmond | |
| 2010/0286910 A1 | 11/2010 | Hudson | |
| 2010/0308005 A1 | 12/2010 | Callanan | |
| 2011/0018439 A1 | 1/2011 | Fabbri et al. | |
| 2011/0118062 A1 | 5/2011 | Krysiak et al. | |

(56) References Cited

U.S. PATENT DOCUMENTS

| | | |
|---|---|---|
| 2012/0069554 A1 | 3/2012 | Toya |
| 2012/0120642 A1 | 5/2012 | Sreshta et al. |
| 2012/0134143 A1 | 5/2012 | Lederer et al. |
| 2012/0193660 A1 | 8/2012 | Donofrio et al. |
| 2012/0200235 A1 | 8/2012 | Shuy et al. |
| 2012/0224359 A1 | 9/2012 | Chun |
| 2013/0107506 A1 | 5/2013 | Mustafa |
| 2013/0187569 A1 | 7/2013 | Chin-Huan |
| 2013/0335953 A1 | 12/2013 | Gold et al. |
| 2014/0003037 A1 | 1/2014 | Kuelzow et al. |
| 2014/0049942 A1 | 2/2014 | Chilton et al. |
| 2014/0118997 A1 | 5/2014 | Snyder |
| 2014/0146525 A1 | 5/2014 | Lueptow |
| 2015/0036325 A1 | 2/2015 | Cohen |
| 2015/0219294 A1 | 8/2015 | Sreshta et al. |
| 2016/0341380 A1 | 11/2016 | Stork et al. |
| 2017/0211760 A9 | 7/2017 | Sreshta et al. |
| 2017/0234493 A1 | 8/2017 | Stork et al. |
| 2022/0299175 A1 | 11/2022 | Stork et al. |
| 2023/0250925 A1 | 8/2023 | Stork et al. |

FOREIGN PATENT DOCUMENTS

| | | |
|---|---|---|
| CN | 101576204 | 11/2009 |
| CN | 101641550 | 2/2010 |
| CN | 101690402 | 3/2010 |
| CN | 101731815 | 6/2010 |
| CN | 201523778 U * | 7/2010 |
| CN | 101886746 | 11/2010 |
| CN | 201715273 | 1/2011 |
| CN | 102116415 | 7/2011 |
| CN | 102379502 | 3/2012 |
| CN | 102403929 | 4/2012 |
| CN | 202203682 | 4/2012 |
| CN | 202511013 | 10/2012 |
| CN | 202884514 | 4/2013 |
| CN | 203215307 | 9/2013 |
| CN | 203489018 | 3/2014 |
| CN | 304445890 | 1/2018 |
| DE | 20209138 | 9/2002 |
| DE | 102006022185 | 11/2007 |
| EP | 002289363-0001 | 8/2013 |
| JP | 2000057808 | 2/2000 |
| JP | 2006047829 | 2/2006 |
| JP | 2006201307 | 8/2006 |
| JP | 2009278763 | 11/2009 |
| WO | WO 2001/83067 | 11/2001 |
| WO | WO 2006/070724 | 6/2006 |

OTHER PUBLICATIONS

U.S. Appl. No. 61/356,274, filed May 17, 2012, Sreshta.
'bbc.com' [online]. "Lantern shines light on disasters," available on or before Feb. 29, 2012, via Internet Archive: Wayback Machine URL<https://web.archive.org/web/20120229073911/http://www.bbc.com/future/story/20120207-lantern-shines-light-on-disasters>, URL<http://www.bbc.com/future/story/20120207-lantern-shines-light-on-disasters>, 2 pages.
Boyd, "Luminad Shining a light on disasters," Published on Feb. 14, 2012, [retrieved on Mar. 1, 2019], retrieved from the Internet: URL :< https://www.bbc.com/future/story/20120207-lantern-shines-light-on-disasters>. 11 page.
Cumberbatch et al, "Self-Assembled Solar Lighting Systems", Oct. 11, 2009, Proc.ISES Solar World Congress, pp. 1-10.
D Light Kiran Lantern, www.dlightdesign.com/products, printed Jun. 15, 2011.
D Light Nova S100, Nova Series, www.dlightdesign.com/products, printed Jun. 15, 2011.
Durapower Solar Power Camping Light. Durapower. Dated Jun. 9, 2023. Found online [Mar. 21, 2024], https://www.amazon.com/Durapower-Rechargeable-Stepless-Hurricane-Emergency/dp/BOC7KKQKFM (Year: 2023).

European Communication of Notice of Opposition, in European Application No. 12875772.1, dated Jan. 18, 2019, 23 pages.
European Search Report dated Sep. 23, 2015, European Pat. Appl. No. 13851862.6, pp. 1-5.
European Search Report in European application No. 12875772 dated Nov. 11, 2015, 8 pages.
Exhibit documents from IPR2018-01524, filed Aug. 8, 2018, 2132 pages.
Floating Solar Pool Light, www.brandsonsale.com, printed Jun. 16, 2011.
Goering Laurie, Blow-up solar lantern lights up Haiti's prospects, Thomson Reuters Foundation, Jun. 22, 2012, http://www.trust.org/item/20120622150100-k9yos/, 11 pages.
'Indiegogo.com' [online]. "LuminAID: an Inflatable Solar Light, Story" Published on Feb. 15, 2012, retrieved from the Internet: URL :<https://www.indiegogo.com/projects/luminaid-an-inflatable-solar-light—3#/updates/all>. 1 page.
'Indiegogo.com' [online]. "LuminAID: An Inflatable Solar Light, Updates" Published on Feb. 15, 2012, retrieved from the Internet: URL :<https://www.indiegogo.com/projects/luminaid-an-inflatable-solar-light—3#/updates/all>. 1 page.
International Search Report and The Written Opinion of the International Searching Authority, International Application No. PCT/US2012/061848, filed Jan. 8, 2013.
International Search Report for International Application No. PCT/US14/10246, mailed Aug. 27, 2014.
International Search Report for International Application No. PCT/US2016/014222, dated Apr. 8, 2016 (2 pages).
Jonsson, J. Project Soul Cell, YouTube, Oct. 28, 2009 (1 page). Retrieved from the Internet: <URL: https://www.youtube.com/watch?v=DG71kgUUr4M>.
Korosec, "An Inflatable Solar light For Disaster Relief (or Camping)," [online]. Published on Nov. 17, 2011, [retrieved on Dec. 18, 2018], retrieved from the Internet: URL :<https:/www.zdnet.com/article/an-Inflatable-solar-light-for-distaster-relief-or-camping/>. 11 pages.
Lichauco De Leon, "Sunlight-powered 'bulbs' made from plastic bottles light up homes." The Guardian, Dec. 23, 2011, p. 1-2, Retrieved from the Internet: <URL:https://www.theguardian.com/environment/2011/Dec. 23/sunlight-bulbs- plastic-bottles-light>.
LuminAID Solar Camping Lantern. By LuminAID. Dated May 3, 2017. Found online [Mar. 21, 2024], https://www.amazon.com/LuminAID-LuminAid-Nova/dp/B0716JV1SG?th=1 (Year: 2017).
'luminaidlab.com' [online]. "LuminAID The World's First Inflatable Solar Light," available on or before Jan. 21, 2012, via Internet Archive: Wayback Machine URL<https://web.archive.org/web/20120121014311//http:/luminaidiab.com:80/blog/ >, URL<http:/luminaidiab.com:80/blog/>, 6 pages.
MEGAPUFF Origami Solar Phone Charger and Lamp. By Solight Design. Dated Jun. 20, 2017. Found online [Mar. 21, 2024], https://www.amazon.com/MEGAPUFF-Origami-Solar-Phone-Charger/dp/BOCJGL332P (Year: 2017).
Mini-BoGo Flashlight, www.bogolight.com/productdetails, printed Jun. 16, 2011.
*MPOWERD Inc.* v. *LuminAID Lab, LLC*, IPR2018-01524, "Petition for Inter Partes Review of 9,347,629", dated Aug. 8, 2018, 71 pages.
Nonfinal Office Action, U.S. Appl. No. 13/163,239, mailed Apr. 24, 2015.
Nonfinal Office Action, U.S. Appl. No. 13/450,974, mailed Mar. 17, 2015.
Nonfinal office action, U.S. Appl. No. 13/163,239, mailed Jun. 5, 2013.
Nonfinal Office Action, U.S. Appl. No. 14/643,519, dated Jul. 6, 2015.
Office Action in Australian Appln. No. 2012378999, dated Dec. 19, 2016, 4 pages.
Office Action in Australian Appln. No. 2017200735, dated Feb. 12, 2018, 3 pages.
Office Action in Chinese Application No. 201288072931.1. dated Feb. 26, 2018, 12 pages, (with English translation).
Office Action in European Application No. 12875772.1, dated Mar. 31, 2017, 6 pages.

(56) References Cited

OTHER PUBLICATIONS

Office Action in European Application No. 12875772.1, dated Nov. 7, 2016, 5 pages.
Office Action in Japanese Application No. 2015510245, dated Jul. 26, 2016, 5 pages (English translation).
Office Action in Korean Application No. 10-2014-7033620, dated Sep. 27, 2018, 14 pages, (with English translation).
Oskay, W., 'Simple Solar Circuits' [Viewed on internet on Dec. 19, 2016], http://www.evilmadscientist.com/2008/simple-solar-circuits/, Published Oct. 22, 2008, 13 pages.
Patent Evaluation Report for Chinese Patent Application No. ZL201320570977.8, dated Feb. 26, 2014, 87 pages, with English translation.
Piejko, "LuminAID solar-powered inflatable lantern—simply a good idea," Published on Nov. 15, 2011, [retrieved on Dec. 14, 2018], retrieved from the Internet: URL :<https://newatlas.com/luminald-solar-powered-lamp/20501/>. 2 pages.
Portable Light Project, http://portablelight.org, printed Jun. 16, 2011.
Sreshta, Andrea M., et al., Solar-Powered Inflatable Light, Kauffman Innovation Network, Inc., Copyright 2011, www.ibridgenetwork.org/columbia, printed Jun. 16, 2011.

\* cited by examiner

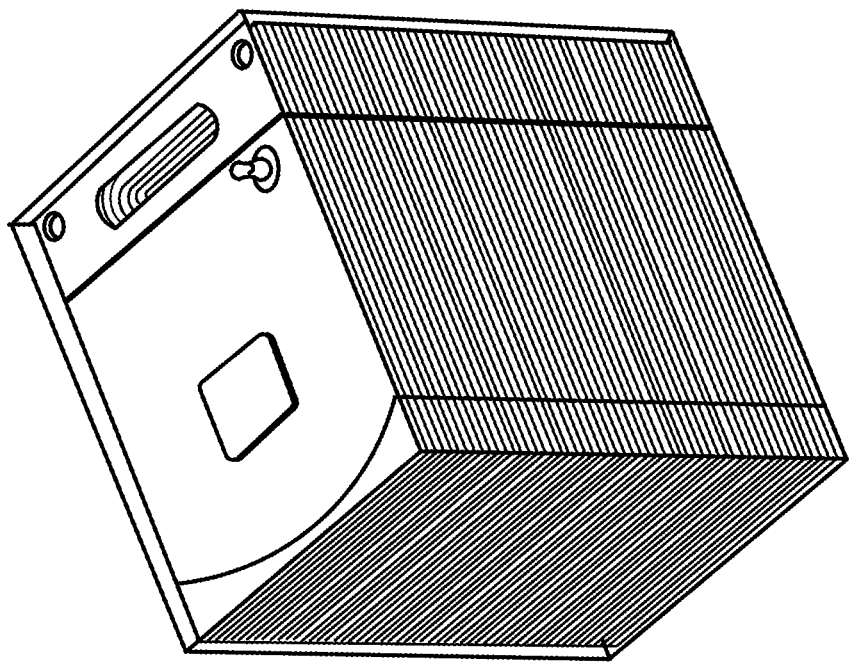
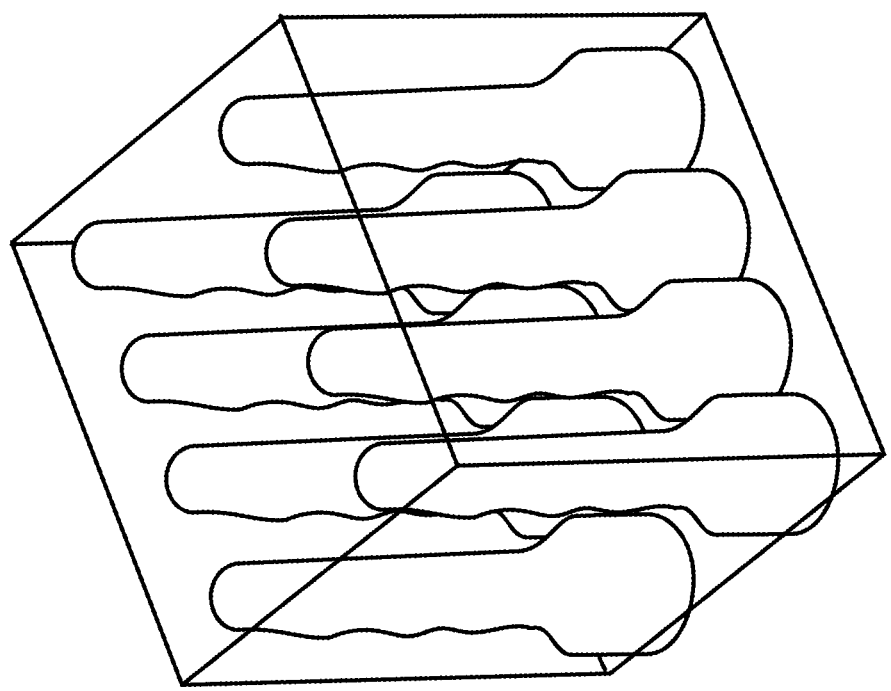
FIG. 12

EXPANDABLE SOLAR-POWERED LIGHT

CROSS REFERENCE TO RELATED APPLICATION(S)

This application is a continuation of and claims the benefit of priority to U.S. Non-Provisional Ser. No. 18/104,412, filed Feb. 1, 2023, which is a continuation of and claims the benefit of priority to U.S. Non-Provisional Ser. No. 17/666,082, filed Feb. 7, 2022, now issued as U.S. Pat. No. 11,592,147 on Feb. 28, 2023, which is a continuation of and claims the benefit of priority to U.S. Non-Provisional Ser. No. 15/585,450, filed May 3, 2017, now issued as U.S. Pat. No. 11,242,962 on Feb. 8, 2022, which is a continuation of and claims priority to U.S. Non-Provisional Ser. No. 15/161,670, filed May 23, 2016, now issued as U.S. Pat. No. 11,255,501 on Feb. 22, 2022, which is a continuation application of U.S. Non-Provisional Ser. No. 14/397,722, filed Oct. 29, 2014, and issued as U.S. Pat. No. 9,347,629 on May 24, 2016, which is a National Stage application of International Publication No. PCT/US2012/061848, filed Oct. 25, 2012, which claims priority to U.S. Provisional Application No. 61/640,769, filed May 1, 2012, the disclosures of which are hereby incorporated by reference in their entirety.

BACKGROUND

Restoring normal life in regions affected by natural disasters or war plays a vital role in recovery efforts. Re-establishing electrical grid infrastructure in those cases can sometimes take weeks or months. There is a need for a solution that can be deployed easily and immediately and with minimal maintenance. Sustainable lighting solutions, including photovoltaic cells coupled to rechargeable batteries, are an ideal approach to providing on-demand lighting with no operating cost. However, current solar-charged light solutions are expensive and difficult to manufacture and transport. This makes them unattractive for large-scale deployment.

One in six people in the world lack stable access to electricity. Many people must rely on dangerous and toxic kerosene lamps as a primary source of light and spend upwards of 30% of their income on this kerosene. With the increasing developments in small scale solar technology, there is no reason why individuals and families should not have a safer, less expensive, and more reliable source of light.

Battery or fuel-powered lighting solutions have the obvious disadvantage of recurring cost and limited resources. On the other hand, most renewable lighting solutions require expensive components and are large and difficult to ship.

SUMMARY

An inflatable solar-powered light is provided. The solar-powered light includes a bladder and a solar-powered light assembly disposed entirely within the bladder. The solar-powered light assembly includes a solar panel, a rechargeable battery in electrical communication with the solar panel, and at least one light-emitting diode in electrical communication with the rechargeable battery. The bladder is substantially transparent, flexible, inflatable, and collapsible.

BRIEF DESCRIPTION OF THE DRAWINGS

The drawings show embodiments of the disclosed subject matter for the purpose of illustrating the invention. However, it should be understood that the present application is not limited to the precise arrangements and instrumentalities shown in the drawings, wherein:

FIG. 12 is a front isometric view of a plurality of stacked solar-powered lights according to some embodiments of the disclosed subject matter in a flat state.

DETAILED DESCRIPTION

Referring now to FIGS. 1-9, aspects of the disclosed subject matter include an inflatable solar-powered light 100 including an expandable bladder 102, a solar-powered light assembly 104, and a cover portion 106. The light is expandable by filling bladder 102 with a gas, liquid, or solid.

Figure 10:
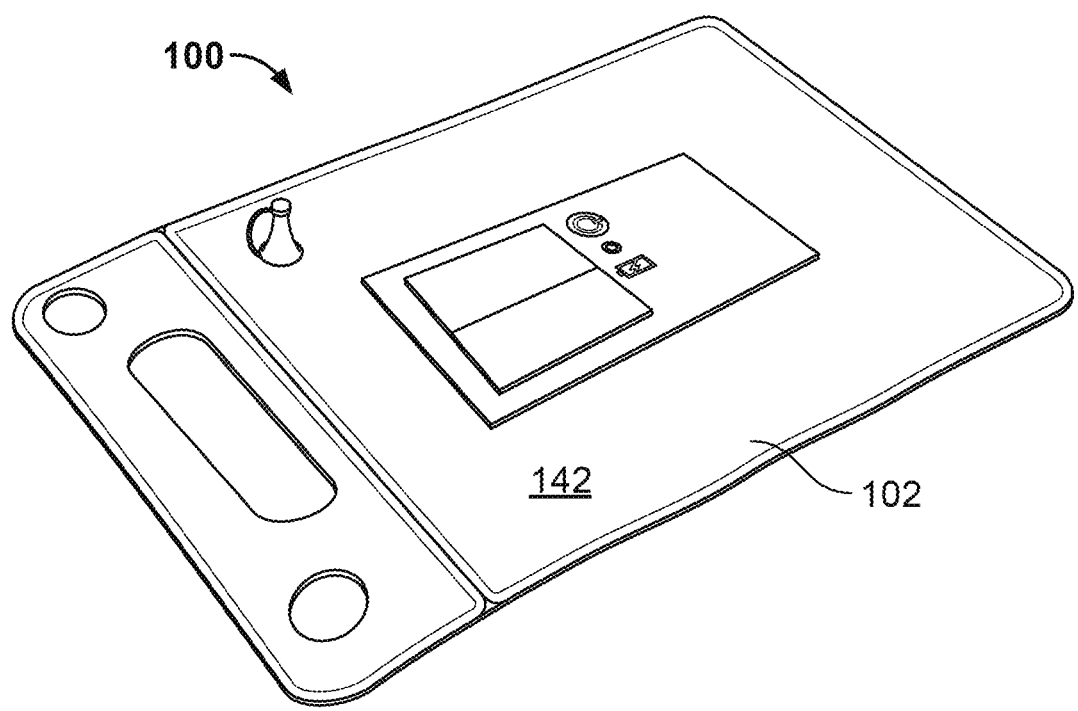
FIG. 10 is a front isometric view of a solar-powered light in a flat state according to some embodiments of the disclosed subject matter.
Figure 11:
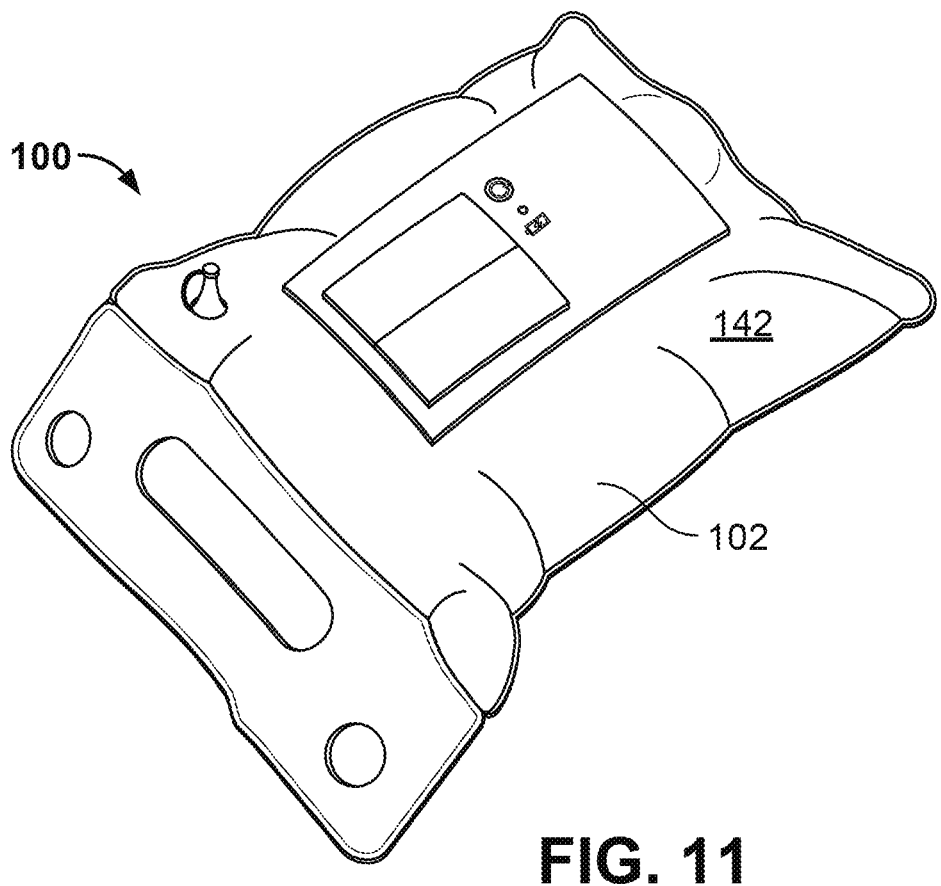
FIG. 11 is a front isometric view of a solar-powered light in an expanded state according to some embodiments of the disclosed subject matter.

As best shown in FIGS. 2-5, in some embodiments, bladder 102 has a plurality of surfaces 108 including at least inside and outside surfaces 110 and 112, respectively. In some embodiments, bladder 102 includes a valve 114 through which the bladder can be expanded and collapsed by inflating filling and deflating or emptying, respectively. Bladder 102 is typically filled with one or more of a gas, e.g., air, liquid, and solid. For example, as shown in FIG. 10, in a first state, bladder 102 is substantially free of gas, liquids, and solids and light 100 is substantially collapsed. Conversely, as shown in FIG. 11, in a second state, bladder 102 includes one or more of a gas, liquid, and solid and light 100 is substantially expanded.

In some embodiments, inflatable bladder 102 is mainly made of thin, plastic based materials that are waterproof, foldable, and can be manufactured with the simple process of heat-sealing. In some embodiments, two layers of semi-transparent PVC material are sealed together on four sides to form bladder 102. In some embodiments, inflatable bladder 102 is made out of one or more of silicone, Mylar, or other materials that expand and contract. Bladder 102 is typically sealable so that light 100 floats.

Figure 2:
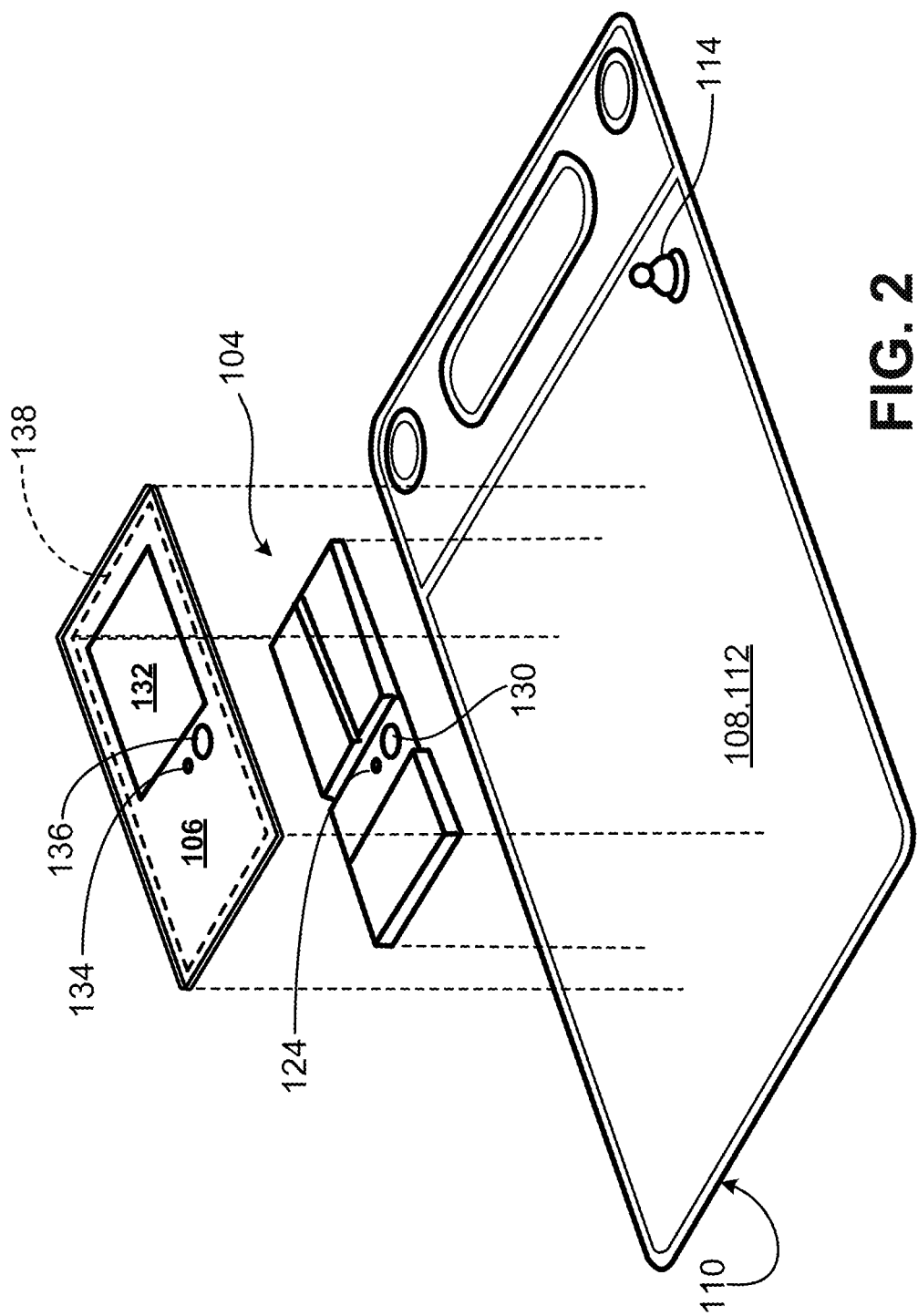
FIG. 2 is a front isometric exploded view of a solar-powered light according to some embodiments of the disclosed subject matter.
Figure 3:
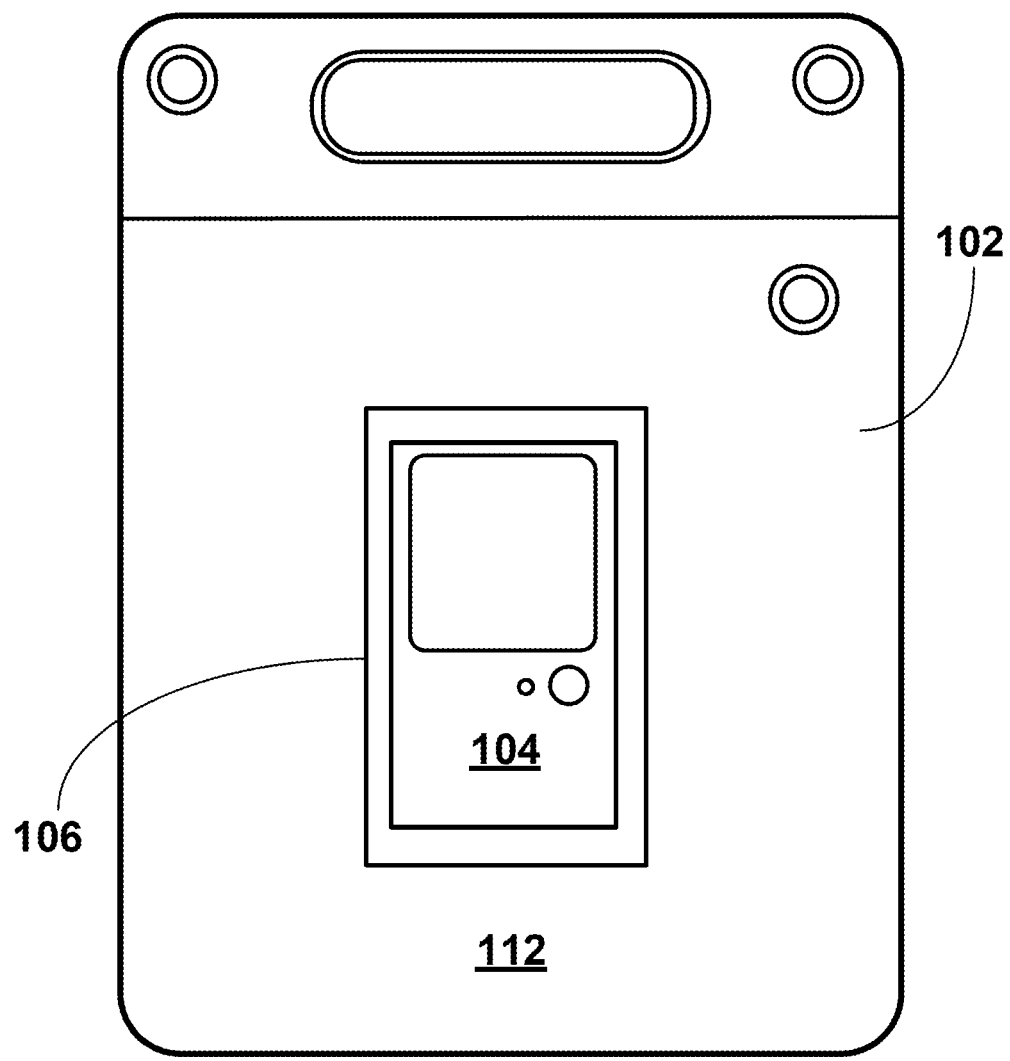
FIG. 3 is a front view of a solar-powered light according to some embodiments of the disclosed subject matter.
Figure 4:
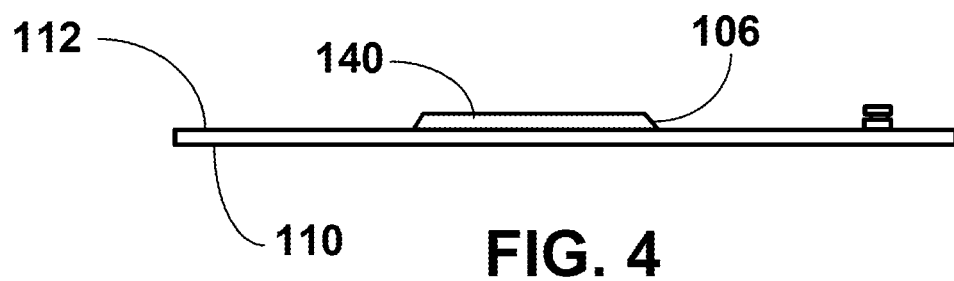
FIG. 4 is a side view of a solar-powered light according to some embodiments of the disclosed subject matter.
Figure 5:
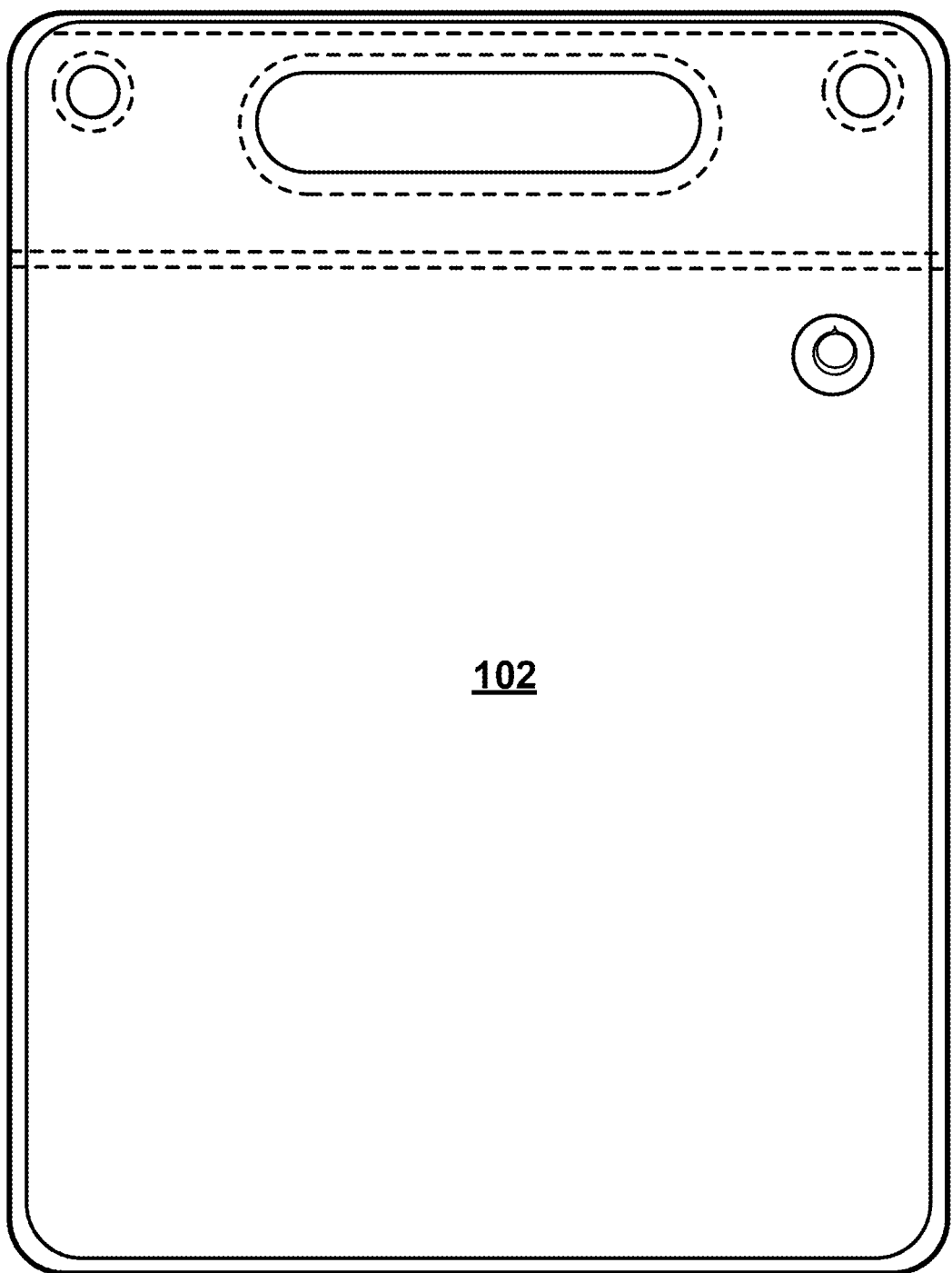
FIG. 5 is a front view of a bladder of a solar-powered light according to some embodiments of the disclosed subject matter.
Figure 6:
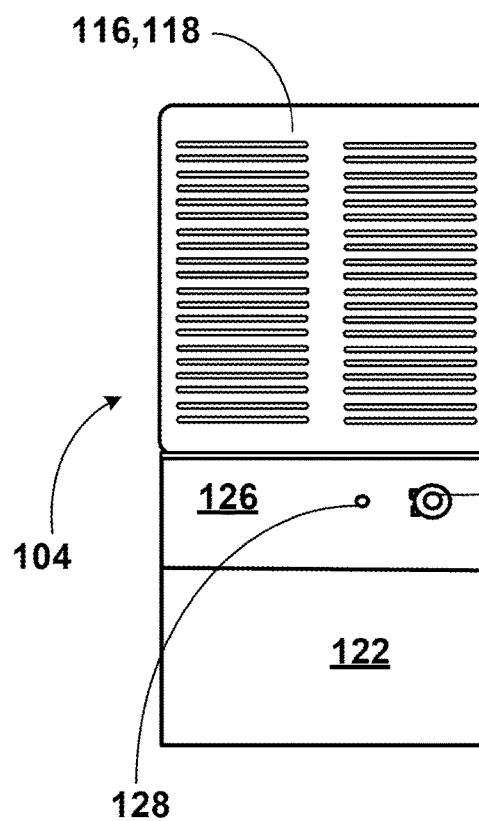
FIG. 6 is a front view of a solar-powered light assembly of a solar-powered light according to some embodiments of the disclosed subject matter.
Figure 7:
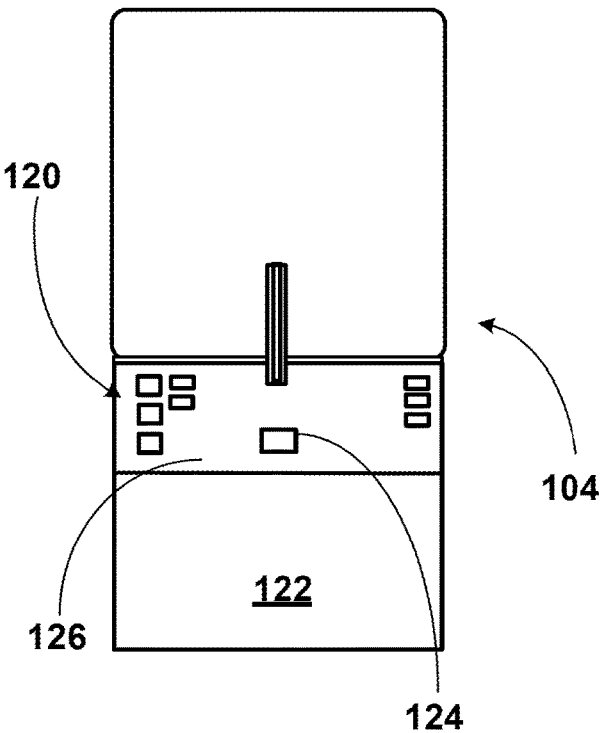
FIG. 7 is a back view of a solar-powered light assembly of a solar-powered light according to some embodiments of the disclosed subject matter.
Figure 8:
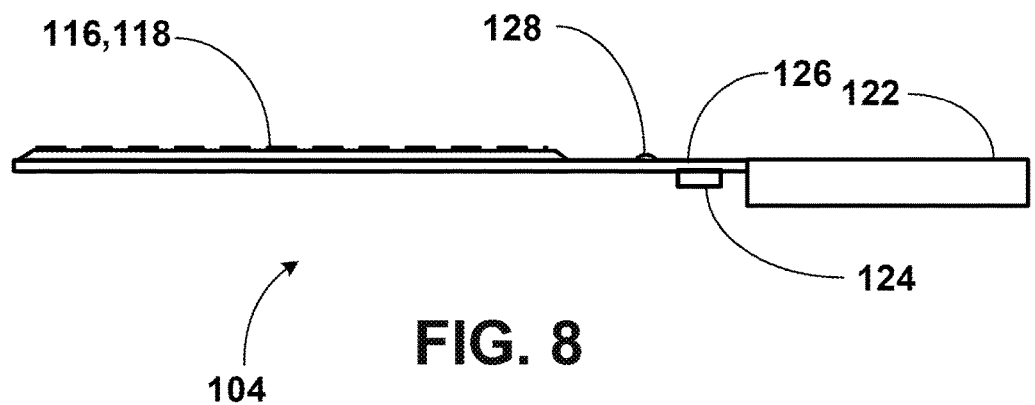
FIG. 8 is a side view of a solar-powered light assembly of a solar-powered light according to some embodiments of the disclosed subject matter.
Figure 9:
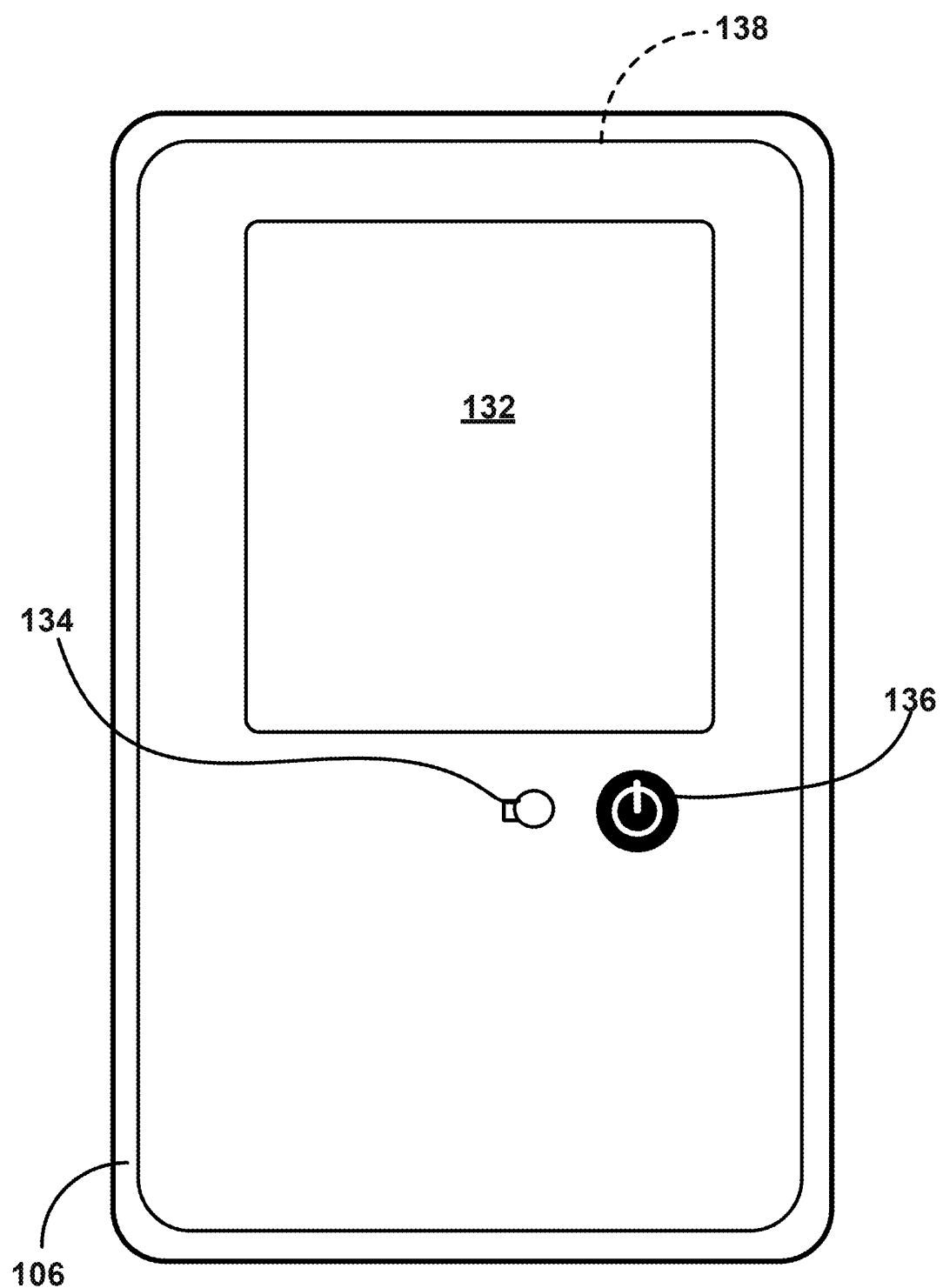
FIG. 9 is a front view of a cover portion of a solar-powered light according to some embodiments of the disclosed subject matter.

As best shown in FIGS. 2-4, solar-powered light assembly 104 is positioned on or adjacent to or joined with one of inside 110 and outside 112 surfaces of bladder 102, e.g., on an outside surface in this embodiment. Referring now to FIGS. 6-8, solar-powered light assembly 104 includes one or more flexible or rigid solar panels 116, e.g., a photovoltaic panel 118, a battery charger 120 in electrical communication with the solar panel, one or more rechargeable batteries 122 in electrical communication with the battery charger, and one or more light emitting diodes (LED) 124 in electrical communication with the rechargeable batteries. Battery charger 120 is typically positioned with one or more of the other components of assembly 104 on a printed circuit board (PCB) 126, which typically includes overcharge control, e.g., comprising one or more resistors and capacitors (not shown), to prevent overcharging rechargeable battery 122 and to control the flow of current to LED 124. In some embodiments, rechargeable batteries 122 include two 3.7 volt coin cell batteries, e.g., 3.7V 680 mAh Li-Ion Polymer. Of course, other size batteries are contemplated depending on the particular application.

In some embodiments, solar-powered light assembly 104 includes multiple, contiguous or non-contiguous portions positioned on the same or different surfaces of bladder 102, e.g., solar panel 116 and PCB 126 are divided or separated onto two or more surfaces of the bladder. For example, in some embodiments, light 100 is cube-shaped and solar panel 116 is on one side of the cube shape and PCB 126 with a press button is positioned on another side of the cube shape.

As mentioned above, in some embodiments, solar-powered light assembly 104 includes PCB 126. As discussed more below, in some embodiments, PCB 126 contains light-emitting diode 124, a small red LED 128 to indicate charging, a switch 130 to turn OFF/ON the main LED, and several resistors and capacitors (not shown) to prevent overcharging the battery and to control the flow of current to the LEDs.

In some embodiments, assembly 104 includes more than one LED 124, e.g., four LEDs, in electrical communication with the rechargeable batteries. Embodiments including more than one LED typically have an increased viewing angle, e.g., four LEDs provides about a 100 to 120 degree viewing angle, which provide approximately 30-40 lumens of light. In some embodiments, assembly 104 includes power switch 130, which is in electrical communication with the rechargeable batteries 122 and LEDs 124. Switch 130 is configured to selectively introduce and prevent the flow of electricity from batteries 122 to LEDs 124. Switch 130 is configured so that a user can control an amount of light output by light 100, e.g., via off, low, and high settings. This can be achieved in at least two ways. First, where there is more than one LED 124, switch 130 can be configured so as to selectively introduce and prevent the flow of electricity from batteries 122 to a desired number of LEDs 124. Alternatively, regardless of the number of LEDs 124, switch 130 can be configured to selectively regulate the flow of electricity from batteries 122 to LEDs 124.

In some embodiments, switch 130 is configured to prevent accidental turn-on, e.g., has enough resistance to being switched and is concave. As mentioned above, some embodiments include charging lights for indicating whether batteries 122 are charged, e.g., LEDs 128 that glow red when the batteries are charging or is when the batteries are fully charged. Charging lights, i.e., LED 128, are in communication with battery charger 120. In some embodiments, depending on the size of solar panel 116, the strength of batteries 122, and number of LEDs 124, the batteries will provide enough power to energize the LEDs for 8 hours on a low setting and 4-6 hours on a high setting, and the batteries will recharge after 5-8 hours in the sun.

Referring now to FIGS. 2-4 and 9, in some embodiments, on or more of cover portion 106 are made of a clear PVC material and include printing on the underside. Cover portion 106 protects and secures solar-powered light assembly 104. Cover portion 106 has a clear window 132 over solar panel 116 to allow for charging. Cover portion 106 also has clear windows 134 over LEDs 124 to allow the light to shine through the cover portion and a red circle 136 to indicate where switch 130 is located on PCB 126. Cover portion 106 is positioned over assembly 104 and joined with at least one of plurality of surfaces 108 of bladder 102 around its edges 138. Cover portion 106 forms a substantially waterproof envelope 140 with at least one of plurality of surfaces 108 of bladder 102 in which solar-powered light assembly 104 is contained. In some embodiments, at least a portion of cover portions 106 are substantially transparent.

In some embodiments, multi-layered cover portions 106 may be used or multiple cover portions positioned on the same or different surfaces 108 of bladder 102, e.g., each cover portion covers a different portion of a multi-portion solar-powered light assembly 104. In some embodiments (not shown), cover portion 106 is defined by a thin, plastic box that encloses light assembly 104. The box is welded/melted to inside 110 or outside surface 112 of bladder 102. In some embodiments, light assembly 104 is held within an inner pocket (not shown) that is formed on inside surface 110 of bladder 102. In some embodiments, cover portion 106 includes an open window (now shown) in the cover, i.e., the cover portion is not a complete surface. In some embodiments, cover portion 106 is substantially opaque and covers the PCB 126, but solar panel 116 is positioned on and joined with a different one surfaces 108 of bladder 102 than the PCB.

Figure 1:
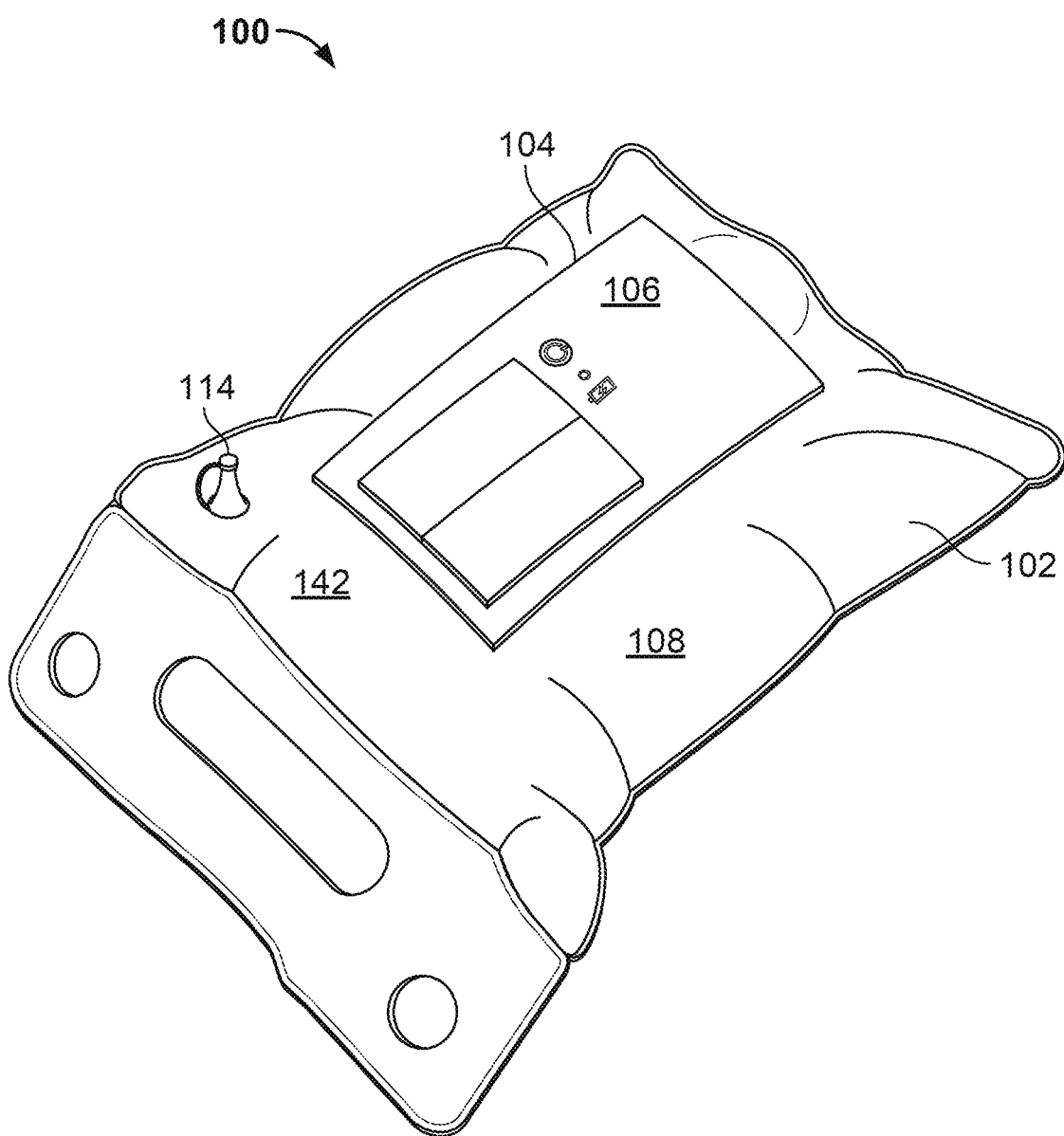
FIG. 1 is a front isometric view of a solar-powered light according to some embodiments of the disclosed subject matter.

As discussed above, inflatable bladder 102 is typically configured to diffuse light to reduce glare and create an ambient light source. In some embodiments, LEDs 124 are positioned so they shine directly into inflatable bladder 102. As best shown in FIGS. 1, 10, and 11, in some embodiments, bladder 102 is fabricated from a semi-transparent material such as a frosted plastic material 142 or similar to promote diffusion of light from LEDs 124. In some embodiments, bladder 102 includes one or more surfaces having a particular pattern (not shown) configured to promote diffusion of light from LEDs 124. In some embodiments, the particular pattern includes a white background portion having a grid of transparent portions that cover about thirty percent of the transparent white pattern.

In some embodiments, bladder 102 is substantially shaped like a pillow. In some embodiments, bladder includes 102 a bottom portion that has a flat bottom surface and a top portion defining a handle. The flat bottom surface generally allows the light to be positioned so as to stand in an upright position. Both bladder 102 and cover portion 106 are generally fabricated from materials that are substantially transparent, flexible, inflatable, and collapsible.

Lights according to the disclosed subject matter offer benefits over known technology. In the wake of a natural disaster, because they are collapsible, they can be shipped in conjunction with other disaster relief supplies. Families and individuals in tent cities are in desperate need of light to improve safety at night. Children need light at night to continue their studies. Lights according to the disclosed subject matter are a cost effective improvement over flashlights and kerosene lanterns. Lights according to the disclosed subject matter are also designed to provide light to individuals with little to no access to a functioning electrical grid. In developing nations, the World Bank estimates that families spend an average of 30% of their disposable income on kerosene lamps and other forms of non-renewable lighting. Lights according to the disclosed subject matter are designed to last 3-5 years. The money families are able to save will allow them to buy food and other necessities.

As shown in FIG. 12, when deflated, some embodiments of the disclosed subject matter are designed to fold up to a minimal volume (particularly when compared to conventional flashlights) that can be easily stored or transported. Still referring to FIG. 12, some embodiments of the disclosed subject matter are designed to be stored and shipped in large quantities cost effectively. Some embodiments of the disclosed subject matter are designed to fold to the size of a wallet and can fit easily within a first-aid kit or backpack. Some embodiments include closure mechanisms, e.g., snaps, hook and loop, or other, for retaining or holding the lights in a folded state. Some embodiments include a karabiner loop formed on the outside of the bladder to more easily attach the light to people and structures.

Lights according to the disclosed subject matter can be used by campers and hikers in outdoor uses as a rechargeable, easy transportable light source. They are waterproof and can be used in water sport activities, e.g., some embodiments include an inflatable ball with solar-led light attached to inside or outside surface. They can also be used as a household pool light.

In some embodiments, the inflatable bladder has a handle that contains a large hole for carrying and two smaller holes. This allows the light to be easily attached by a string or hook and hung from a backpack, the inside of a tent, a ceiling, etc. Lights according to the disclosed subject matter can also be tied to each other to form a string of lights.

Existing solar products have not been designed for disaster relief or emergency aid where distribution is a serious challenge. Lights according to the disclosed subject matter offer a solution because they are lightweight and cost-effectively shipped, transported, and distributed. Lights according to the disclosed subject matter are also useful for individuals who would like a solar-rechargeable light to keep in their home or in a first-aid kit in case of an emergency. Lights according to the disclosed subject matter have outdoor applications in boating, camping, and fishing. Lights according to the disclosed subject matter are lightweight, waterproof, pack flat, are extremely portable, and can be printed with patterns and logos.

Although the disclosed subject matter has been described and illustrated with respect to embodiments thereof, it should be understood by those skilled in the art that features of the disclosed embodiments can be combined, rearranged, etc., to produce additional embodiments within the scope of the invention, and that various other changes, omissions, and additions may be made therein and thereto, without parting from the spirit and scope of the present invention.

What is claimed is:

1. An expandable lamp, comprising:
   an expandable bladder comprising:
      a first surface; and
      a second surface, the second surface opposed to the first surface, the expandable bladder having a collapsed state and an expanded state; and
   an electronics assembly coupled to the first surface, the electronics assembly comprising:
      a solar panel,
      a circuit board,
      a rechargeable battery electrically connected to the circuit board, and
      at least one light-emitting diode (LED) configured to aim toward the second surface when the expandable bladder is in the expanded state; and
   a substantially transparent cover portion configured to cover the solar panel at an exterior surface of the first surface, the substantially transparent cover portion being waterproof.

2. The expandable lamp of claim 1, wherein the solar panel is positioned with respect to the first surface such that the at least one LED is located on an interior surface of the first surface and the solar panel is located on the exterior surface of the first surface.

3. The expandable lamp of claim 2, wherein the LED is configured to direct light toward an interior surface of the second surface when the expandable bladder is in the expanded state.

4. The expandable lamp of claim 2, wherein the expandable bladder is configured to be folded into a substantially rectangular shape when the expandable bladder is in the collapsed state.

5. The expandable lamp of claim 4, further comprising at least one closure mechanism configured to retain the expandable bladder in the collapsed state.

6. The expandable lamp of claim 5, wherein the at least one closure mechanism comprises straps with hook and loop portions.

7. The expandable lamp of claim 1, further comprising a carabiner loop coupled to the expandable bladder.

8. The expandable lamp of claim 1, wherein the expandable bladder further comprises a valve providing a valve passage through the first surface to an interior of the expandable bladder, the expandable bladder configured inflatable by a gas or liquid through the valve passage.

9. The expandable lamp of claim 8, wherein the valve comprises a removable cover over the valve passage.

10. The expandable lamp of claim 1, further comprising a power switch in electrical communication with the rechargeable battery and the at least one LED, wherein the power switch is configured to control an amount of light emitted by the LED.

11. An expandable lamp, comprising:
    an expandable bladder comprising:
       a first flexible surface; and
       a second flexible surface, the second flexible surface opposed to the first flexible surface, the first and second flexible surfaces configured to have at least partially rounded shapes defined by first and second edges, respectively, and the expandable bladder having a collapsed state and an expanded state; and
    an electronics assembly coupled to the first flexible surface, the electronics assembly comprising at least one light-emitting diode (LED) configured to aim toward the second flexible surface when the expandable bladder is in the expanded state;
    wherein in the expanded state the first flexible surface is moved away from the second flexible surface such that the expandable bladder has a pillow-like rounded shape.

12. The expandable lamp of claim 11, wherein the first flexible surface has a length from a first end to a second end greater than a width from a first side to a second side.

13. The expandable lamp of claim 11, wherein the first flexible surface and the second flexible surface comprise polymeric materials.

14. The expandable lamp of claim 13, wherein the polymeric materials are waterproof and flexible.

15. The expandable lamp of claim 14, wherein at least one of the first flexible surface and the second flexible surface is configured to diffuse light from the LED.

16. The expandable lamp of claim 14, wherein at least one of the first flexible surface and the second flexible surface comprise a semi-transparent material.

17. The expandable lamp of claim 14, wherein at least one of the first flexible surface and the second flexible surface comprises a substantially transparent material.

18. The expandable lamp of claim 11, the electronics assembly further comprising a power switch in communication with the at least one LED, the power switch configured to control an amount of light output by the at least one LED.

19. The expandable lamp of claim 11, wherein the first flexible surface comprises a first panel defined by a first edge, and the second flexible surface comprises a second panel defined by a second edge, the second panel opposed to the first panel, the first panel sealed to the second panel at the first and second edges.

20. The expandable lamp of claim 11, further comprising a carabiner loop coupled to the expandable bladder.

* * * * *